Nov. 9, 1965  T. M. HALLOWAY  3,216,248
HEAT TRANSFER METERS
Filed Oct. 3, 1962
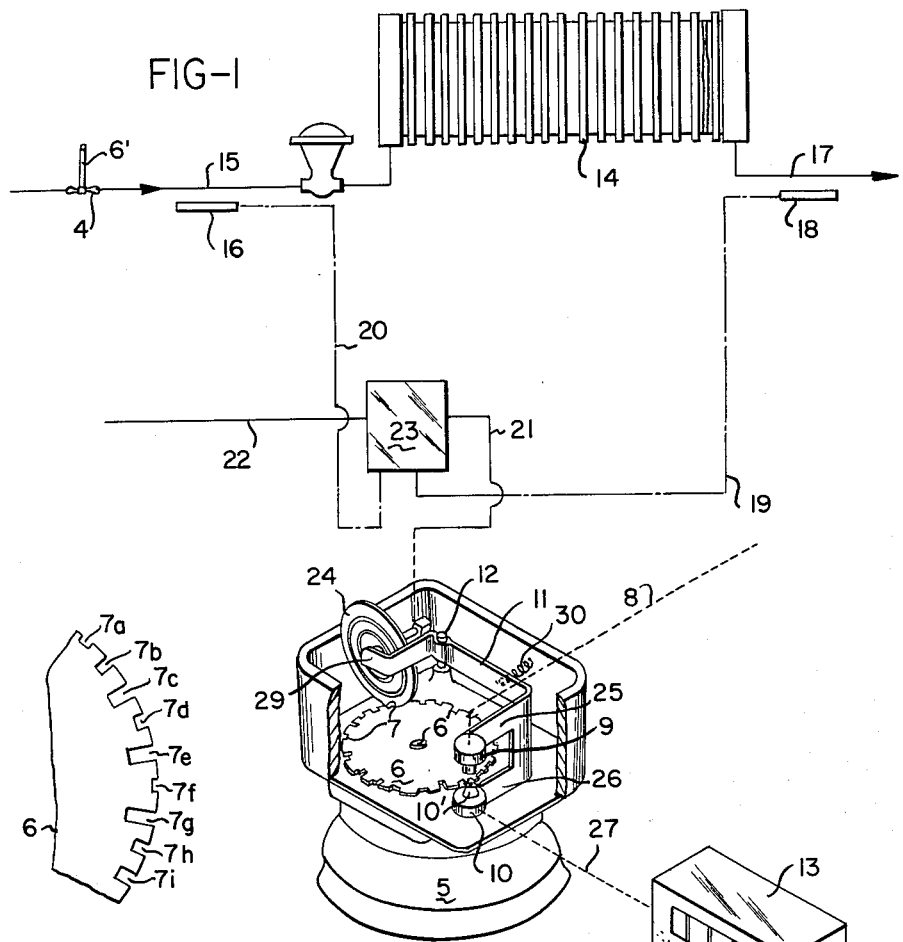
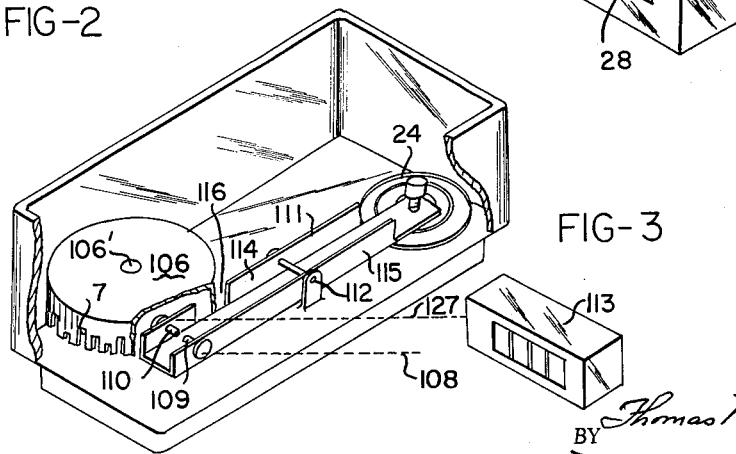
INVENTOR.
Thomas M. Holloway
BY
Morsell & Morsell United States Patent Office 3,216,248
Patented Nov. 9, 1965

3,216,248
HEAT TRANSFER METERS
Thomas M. Holloway, Waukesha, Wis., assignor to Johnson Service Company, Milwaukee, Wis., a corporation of Wisconsin
Filed Oct. 3, 1962, Ser. No. 228,069
10 Claims. (Cl. 73—193)

This invention relates in general to improvements in heat transfer meters.

Heretofore meters capable of measuring heat transfer, such as in a heating system where fluid is circulated, have been complicated and costly.

It is a general object of the present invention to provide a meter of the class described, which is of simplified design and which can, therefore, be manufactured at a relatively low cost.

A more specific object of the invention is to provide a meter of the class described which includes a wheel having slots of varying length which are adapted to permit flow from an energy emitter to a collector when the latter are aligned with the slots, said emitter and collector being movably mounted and the position thereof relative to the slots being responsive to a change in condition of a medium to cause more or less pulses of energy per revolution of the wheel to pass from the emitter through the slots, the number of slots uncovered per revolution being proportional to the change in the particular medium; for example, being proportional to the temperature difference on the two sides of a fluid heat exchanger.

With the above and other objects in view, the invention consists of the improved meter and all of its parts and combinations as set forth in the claims, and all equivalents thereof.

FIG. 1 is a diagrammatic view partially in perspective showing one of the improved thermal unit meters as used in conjunction with a heat exchanger, there being a differential temperature transmitter in connection therewith for transmitting a control air pressure to the meter which is proportional to the temperature differential on the two sides of the heat exchanger;

FIG. 2 is an enlarged fragmentary plan view of a slotted disc; and

FIG. 3 is a partially diagrammatic view of a modified form of meter, parts being broken away.

Referring more particularly to the drawing, the improved meter, which is designated generally by the numeral 5, includes a rotatably supported disc 6 mounted on a rotating shaft 6'. The shaft 6' may be the shaft of a known meter, with the speed of the shaft proportional to fluid flow when used as a B.t.u. meter. In the exemplification of FIG. 1, an impeller 4 on the shaft 6' is driven by the flow of fluid in conduit 15.

As shown more clearly in FIG. 2, the disc has its periphery formed with slots 7a, 7b, 7c, 7e, 7f, 7g, 7h and 7i, all of which vary in length from one another. A set of slots such as shown in FIG. 2 may be repeated a plurality of times on the circumference of the disc. When thus repeated, the slots of subsequent sets may be of the same length as corresponding slots of the first set, or the slots of each subsequent set may be of slightly different length than the corresponding slots of all of the other sets, in which case no two slots on the wheel are of the same length. The particular arrangement may obviously be varied to suit particular requirements. The slots extend radially and are spaced substantially equally in a circumferential direction.

Pivotally mounted adjacent the disc, as at 12, is a lever 11 having one end forked to provide the arms 25 and 26. The arm 25 supports an energy emitter 9 which, in the preferred embodiment, is a jet connected with an air pressure line 8 leading from a suitable source of air under pressure. Carried by the lower arm 26 is an energy collector 10 arranged to operate a counter 13. In the illustrated embodiment, the counter is pneumatically operated, the collector being connected by an air conduit 27 with the counter or other device 13. The collector has a receiving nozzle 10' with an orifice which is directly in alignment with the orifice of the jet emitter 9. When one of the slots 7 is between the emitter and the nozzle 10' of the collector, then a pulse of energy, in the form of a stream of air under pressure, is allowed to pass through the slot, into the collector nozzle 10', to act through the air conduit 27 upon the counter 13 and cause a recording of the pulse on a dial 28.

If the arms 25 and 26 of the lever 11 are close to the periphery of the disc, there will be a pulse for every slot, including the shortest ones. If the lever is swung on the pivot 12 so that the arms 25 and 26 are in a radially inward direction with respect to the periphery of the disc 6, then fewer and fewer of the slots 7 are long enough to allow a pulse of air to pass into the collector 10. If the lever is swung far enough inwardly, there will be no slots long enough to expose the jet.

On the opposite side of the pivot 12, the lever has an arm portion 29 which is adapted to be acted upon by a diaphragm 24, the latter being mounted in fixed position on the frame of the meter. The diaphragm is of any well known construction and is responsive to the air pressure in the control air line 21 from a differential temperature transmitter 23, or other suitable instrument.

Referring now more particularly to FIG. 1, showing one method of using the meter, there is a fluid heat exchanger 14 having an inlet line 15 and outlet line 17. A temperature sensing bulb 16 or other suitable thermostatic member is so positioned at the inlet as to be affected by the temperature of the fluid therein. Similarly, a temperature sensing element or bulb 18 is responsive to the temperature in the outlet line 17. The bulbs 16 and 18 act through the capillary tubes 20 and 19, respectively, to transmit changes in pressure which are responsive to the temperature changes at 16 and 18. These pressure changes act on the differential temperature transmitter to cause the air pressure in the control air line to be proportional to the temperature differential between the inlet line 15 and the outlet line 17, and this pressure in the line 21 acts through the diaphragm 24 to move the lever 11 in one direction or the other.

In the preferred embodiment the lever 11 is urged in one direction by a spring, such as the spring 30, with the diaphragm 24 acting in the reverse direction on the lever. The arrangement is such that as the differential temperature between 15 and 17 increases, the diaphragm acts on the lever 11 to move the jet emitter and collector 9 and 10 closer to the periphery of the disc 6 to uncover more and more slots so that there are more pulses recorded per revolution of the disc. When the temperature difference decreases, the reverse action takes place on the lever. Thus, the number of slots 7 uncovered per revolution is proportional to the temperature difference between 15 and 17. The device is so designed that each pulse in the line 27 is equal to a predetermined number of B.t.u.'s The counter 13 may be any known pneumatically-operated counter for registering the pulses, but the counter may, of course, be actuated by other means than pneumatic.

In the modification of FIG. 3, which shows one of the alternative forms that the invention can take, the wheel 106 is in the form of a drum instead of in the form of a disc. Here the lever 111 is pivoted at 112 to move in a different plane from the lever of FIG. 1. The lever 111 is in the form of a channel having upstanding sides 114 and 115. The side 114 is broken out as at 116 to accommodate the rim of the drum. The jet collector 110 is mounted on that portion of the flange 114 which is within the rotating drum and is connected by the conduit 127 with the counter 113. The jet emitter 109 is supported on the lever flange 115 to be external of the rim of the drum. It receives its air under pressure from the supply conduit 108. The slots 7 in the rim of the drum are of varying length just as in the disc of FIG. 1, but they extend in a direction parallel to the axis of rotation of the drum, and the action of the lever 111, when it is pivoted, causes the emitter 109 and collector 110 to be moved transversely of the rim of the drum in a direction generally parallel to its axis of rotation. When the outer end of the lever 111 is in a lowered position (referring to FIG. 3), there will be a maximum number of pulses recorded per revolution of the drum. When said end of the lever is moved upwardly, there will be less and less pulses recorded per revolution. The diaphragm 124 of FIG. 3 may be operated in the same manner as the diaphragm 24 of FIG. 1.

The use of a differential pressure transmitter as in the present invention permits a wide selection of temperature operating ranges and a broad range of differential temperature spans. A change in the differential span would only mean a change in the number of B.t.u.'s indicated by each pulse, so that actual B.t.u.'s would equal the reading on the counter 13 or 113 times a predetermined calibration factor. The differential temperature transmitter may be of the type shown in Holloway Patent No. 3,016,746, dated January 16, 1962, or it may be of any other known design.

This device of FIG. 1 is characterized by the equation $Q = Kwc\Delta t$ where:

$Q$ = Heat exchanged in the heat exchanger (see Diagram 1), B.t.u.

$\Delta t$ = Temperature difference between inlet and outlet (see Diagram 1), F.

$c$ = Specific heat of the fluid, B lb.$^{-1}$F.$^{-1}$ $w$ = Mass flow rate of the fluid, lb. hr.$^{-1}$ $K$ = Calibration factor (dimensions are such that the product $Kw$ equals the mass of the fluid that has passed through the meter)

$Q$ is B.t.u. meter "output," $w$ is input to meter from fluid meter and $\Delta t$ is input to B.t.u. meter from differential temperature transmitter.

Various changes and modifications may be made without departing from the spirit of the invention and all such changes are contemplated as may come within the scope of the claims.

What I claim is:

1. A B.t.u. meter for use with a fluid heat exchanger having a fluid inlet conduit and a fluid outlet conduit comprising a rotatably-supported wheel adapted to be driven by flow of fluid through one of said conduits having a peripheral portion with peripherally spaced slots, a jet emitter, means for supplying a fluid under pressure to said emitter, a jet collector having a collecting nozzle, movable support means supporting said jet emitter and collector in alignment with one another on opposite sides of said peripheral portion of the wheel for movement in unison longitudinally on said slots whereby a pulse of fluid is allowed to pass into said collector whenever a slot exposes the collector to the jet during rotation of the wheel, a counter connected with said collector and responsive to pulses therein, and means including temperature responsive members adjacent said fluid inlet and fluid outlet of the heat exchanger responsive to a change in the temperature differential between said fluid inlet and outlet for causing movement of said movable support means and resulting movement of said jet emitter and collector longitudinally of said slots in proportion to said change, said slots in the wheel being of varying length so that the number of pulses per revolution of the wheel varies in a predetermined manner with the position of said jet emitter and collector relative to said slots.

2. A B.t.u. meter for use with a fluid heat exchanger having a fluid inlet conduit and a fluid outlet conduit comprising a rotatably-supported wheel adapted to be driven by flow of fluid through one of said conduits having a peripheral portion with peripherally spaced slots, a jet emitter, means for supplying a fluid under pressure to said emitter, a jet collector having a collecting nozzle, movable support means supporting said jet emitter and collector in alignment with one another on opposite sides of said peripheral portion of the wheel for movement in unison longitudinally on said slots whereby a pulse of fluid is allowed to pass into said collector whenever a slot exposes the collector to the jet during rotation of the wheel, a counter connected with said collector and responsive to pulses therein, and means including temperature responsive members adjacent said fluid inlet and fluid outlet of the heat exchanger responsive to a change in the temperature differential between said fluid inlet and outlet and including a differential temperature transmitter for causing movement of said movable support means and resulting movement of said jet emitter and collector longitudinally of said slots in proportion to said change, said slots in the wheel being of varying length so that the number of pulses per revolution of the wheel varies in a predetermined manner with the position of said jet emitter and collector relative to said slots.

3. A B.t.u. meter for use with a fluid heat exchanger having a fluid inlet conduit and a fluid outlet conduit comprising a rotatably-supported wheel adapted to be driven by flow of fluid through one of said conduits having a peripheral portion with peripherally spaced slots, a jet emitter, means for supplying a fluid under pressure to said emitter, a jet collector having a collecting nozzle, movable support means supporting said jet emitter and collector in alignment with one another on opposite sides of said peripheral portion of the wheel for movement in unison longitudinally on said slots whereby a pulse of fluid is allowed to pass into said collector whenever a slot exposes the collector to the jet during rotation of the wheel, a counter connected with said collector and responsive to pulses therein, and means including temperature responsive members adjacent said fluid inlet and fluid outlet of the heat exchanger responsive to a change in the temperature differential between said fluid inlet and outlet and including a pneumatic differential temperature transmitter for causing movement of said movable support means and resulting movement of said jet emitter and collector longitudinally of said slots in proportion to said change, said slots in the wheel being of varying length so that the number of pulses per revolution of the wheel varies in a predetermined manner with the position of said jet emitter and collector relative to said slots.

4. In combination with a heat exchanger having a fluid inlet conduit and having a fluid outlet conduit, a rotatably-supported wheel positioned to be driven by flow of fluid through one of said conduits and having a peripheral portion with peripherally spaced slots, a jet emitter, means for supplying a fluid under pressure to said emitter, a jet collector having a collecting nozzle, a pivoted lever supporting said jet emitter and collector in alignment with one another on opposite sides of said peripheral portion of the wheel for movement in unison longitudinally on said slots whereby a pulse of fluid is allowed to pass into said collector whenever a slot exposes the collector to the jet during rotation of the wheel, a counter connected with said collector and responsive to pulses therein, a fluid pressure operated motor positioned to move said lever, and pneumatic means including temperature responsive members adjacent said fluid pressure inlet and outlet conduits of the heat exchanger responsive to a change in the temperature differential between said fluid inlet and outlet and including a pneumatic differential temperature transmitter for causing operation of said motor and hence movement of said lever and resulting movement of said jet emitter and collector longitudinally of said slots in proportion to said change, said slots in the wheel being of varying length so that the number of pulses per revoluion of the wheel varies in a predetermined manner with the position of said jet emitter and collector relative to said slots.

5. A meter for use with a fluid conduit comprising a rotatably-supported wheel having a peripheral portion with peripherally spaced slots, means responsive to the flow of fluid in said conduit for driving said wheel, a jet emitter, means for supplying another fluid under pressure to said emitter, a jet collector having a collecting nozzle, movable support means supporting said jet emitter and collector in alignment with one another on opposite sides of said peripheral portion of the wheel for movement in unison longitudinally of said slots whereby a pulse of fluid is allowed to pass into said collector whenever a slot exposes the collector to the jet during rotation of the wheel, a counter connected with said collector and responsive to pulses therein, and means responsive to a change in the differential temperature of the fluid in said conduit for causing movement of said movable support means and resulting movement of said jet emitter and collector longitudially of said slots in proportion to said change, said slots in the wheel being of varying length so that the number of pulses per revolution of the wheel varies in a predetermined manner with the position of said jet emitter and collector relative to said slots.

6. A meter for use with a fluid conduit comprising a rotatably-supported disc having a peripheral portion with peripherally spaced radially extending slots, means responsive to the flow of fluid in said conduit for driving said wheel, a jet emitter, means for supplying another fluid under pressure to said emitter, a jet collector having a collecting nozzle, movable support means supporting said jet emitter and collector in alignment with one another on opposite sides of said peripheral portion of the wheel for movement radially of said disc in unison longitudinally of said slots whereby a pulse of fluid is allowed to pass into said collector whenever a slot exposes the collector to the jet during rotation of the wheel, a counter connected with said collector and responsive to pulses therein, and means responsive to a change in the differential temperature of fluid in said conduit for causing movement of said movable support means in proportion to said change, said slots in the wheel being of varying radial length so that the number of pulses per revolution of the wheel varies in a predetermined manner with the position of said jet emitter and collector relative to said slots.

7. A meter for use with a fluid conduit comprising a rotatably-supported disc having a peripheral portion with peripherally spaced radially extending slots, means responsive to the flow of fluid in said conduit for driving said wheel, a jet emitter, means for supplying another fluid under pressure to said emitter, a jet collector having a collecting nozzle, a pivoted lever supporting said jet emitter and collector in alignment with one another on opposite sides of said peripheral portion of the wheel for movement radially of said disc in unison longitudinally of said slots whereby a pulse of fluid is allowed to pass into said collector whenever a slot exposes the collector to the jet during rotation of the wheel, a counter connected with said collector and responsive to pulses therein, and means responsive to a change in the differential temperature of the fluid in said conduit for causing movement of said lever in proportion to said change, said slots in the wheel being of varying radial length so that the number of pulses per revolution of the wheel varies in a predetermined manner with the position of said jet emitter and collector relative to said slots.

8. A B.t.u. meter for use with a fluid heat exchanger having a fluid circuit with a fluid inlet and a fluid outlet comprising a rotatably-supported wheel having a peripheral portion with peripherally spaced slots, means responsive to the flow of fluid in the circuit to said heat exchanger for driving said wheel, a jet emitter, means for supplying another fluid under pressure to said emitter, a jet collector having a collecting nozzle, movable support means supporting said jet emitter and collector in alignment with one another on opposite sides of said peripheral portion of the wheel for movement in unison longitudinally of said slots whereby a pulse of fluid is allowed to pass into said collector whenever a slot exposes the collector to the jet during rotation of the wheel, a counter connected with said collector and responsive to pulses therein, and means including temperature responsive members adjacent said fluid inlet and fluid outlet of the heat exchanger responsive to a change in the temperature differential between said fluid inlet and outlet for causing movement of said movable support means and resulting movement of said jet emitter and collector longitudinally of said slots in proportion to said change, said slots in the wheel being of varying length so that the number of pulses per revolution of the wheel varies in a predetermined manner with the position of said jet emitter and collector relative to said slots.

9. A meter for use with a fluid conduit comprising a rotatably-supported drum having a rim with peripherally spaced slots extending in the general direction of the axis of rotation of the drum, means responsive to the flow of fluid in said conduit for driving said drum, a jet emitter, means for supplying another fluid under pressure to said emitter, a jet collector having a collecting nozzle, movable support means supporting said jet emitter and collector in alignment with one another on opposite sides of said rim of the drum for movement in unison longitudinally on said slots whereby a pulse of fluid is allowed to pass into said collector whenever a slot exposes the collector to the jet during rotation of the drum, a counter connected with said collector and responsive to pulses therein, and means responsive to a change in the differential temperature of the fluid in said conduit for causing movement of said movable support means in proportion to said change, said slots in the drum rim being of varying length so that the number of pulses per revolution of the drum varies in a predetermined manner with the position of said jet emitter and collector relative to said slots.

10. A meter for use with a fluid conduit comprising a rotatably-supported wheel having a peripheral portion with peripherally spaced slots, means responsive to the flow of fluid in said conduit for driving said wheel, a jet emitter, means for supplying another fluid under pressure to said emitter, a jet collector having a collecting nozzle, movable support means supporting said jet emitter and collector in alignment with one another on opposite sides of said peripheral portion of the wheel for movement in unison longitudinally on said slots whereby a pulse of fluid is allowed to pass into said collector whenever a slot exposes the collector to the jet during rotation of the wheel, a counter connected with said collector and responsive to pulses therein, and means including a fluid pressure operated diaphragm responsive to a change in the differential temperature of fluid in said conduit for causing movement of said movable support means and resulting movement of said jet emitter and collector longitudinally of said slots in proportion to said change, said slots in the wheel being of varying length so that the number of pulses per revolution of the wheel varies in a predetermined manner with the position of said jet emitter and collector relative to said slots.

References Cited by the Examiner

UNITED STATES PATENTS 2,309,015  1/43  Royer _____ 73—183

RICHARD C. QUEISSER, *Primary Examiner.*